United States Patent
Becker et al.

(10) Patent No.: US 7,226,272 B2
(45) Date of Patent: Jun. 5, 2007

(54) HINGELESS ROTOR PROVIDED WITH PLATE-SHAPED ROTOR HEAD ELEMENT AND A ROTORCRAFT PROVIDED WITH SAID ROTOR

(75) Inventors: Gerold Becker, Maisach (DE); Rupert Pfaller, Riemerling (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 10/553,015

(22) PCT Filed: Apr. 6, 2004

(86) PCT No.: PCT/EP2004/003640

§ 371 (c)(1),
(2), (4) Date: Oct. 11, 2005

(87) PCT Pub. No.: WO2004/089745

PCT Pub. Date: Oct. 21, 2004

(65) Prior Publication Data

US 2006/0216150 A1  Sep. 28, 2006

(30) Foreign Application Priority Data

Apr. 8, 2003  (DE) ................ 103 16 092

(51) Int. Cl.
*B64C 27/33* (2006.01)

(52) U.S. Cl. ................ 416/134 A; 416/244 R

(58) Field of Classification Search ............ 416/134 A, 416/226, 244 R, 140, 141, 102, 106, 107, 416/170 R; 244/17.11

See application file for complete search history.

(56) References Cited

U.S. PATENT DOCUMENTS 3,880,551 A * 4/1975 Kisovec ................ 416/134 R
6,039,538 A   3/2000 Bansemir ............. 416/134 A

FOREIGN PATENT DOCUMENTS

DE    197 01 403    2/1998

OTHER PUBLICATIONS

International Search Report for PCT/EP2004/003640 (2 pages).

* cited by examiner

*Primary Examiner*—Richard A. Edgar
(74) *Attorney, Agent, or Firm*—Darby & Darby

(57) ABSTRACT

The invention relates to a rotor comprising a rotor shaft, a rotation torque transmission element which is mounted thereon and at least one element of the plate-shaped rotor head whose axis of rotation extends therethrough. Said rotor is provided with two groups of different arms. The first group consists of the flexible rotor blade connection arms which remove centrifugal forces and to which a respective blade can be fixed. The second group consists of flexible connection rotor arms which are devoid of centrifugal force to which the elements of the plate-shape rotor head can be rotationally fixed by means of the rotation torque transmission element.

13 Claims, 3 Drawing Sheets

HINGELESS ROTOR PROVIDED WITH PLATE-SHAPED ROTOR HEAD ELEMENT AND A ROTORCRAFT PROVIDED WITH SAID ROTOR

The present invention relates to a hingeless rotor with a plate-shaped rotor head element as well as to a rotary-wing aircraft having such a rotor.

BACKGROUND

An object of the present in invention is to provide a hingeless rotor that exhibits high strength, low weight, a small flapping hinge distance and/or a high degree of swing-stiffness. An alternate or additional object of the present invention is to provide a rotary-wing aircraft having such a rotor.

SUMMARY OF THE INVENTION

The present invention provides a hingeless rotor that includes a rotor mast, a torque-transmission element arranged rotationally fixed with respect to the rotor mast and at least one plate-shaped rotor head element through which the axis of rotation of the rotor passes and which has two different groups of arms, the first group of which has bending-flexible rotor blade-connection arms that dissipate centrifugal forces and to each of which a rotor blade can be connected, and the second group of which has bending-flexible rotor mast-connection arms that are free of centrifugal force and to which the plate-shaped rotor head element is connected via the torque-transmission element arranged rotationally fixed with respect to the rotor mast.

The bending-flexible rotor blade-connection arms that dissipate centrifugal forces are preferably designed so as to be bending-flexible in the beating direction of the rotor blades, that is to say, here they are beating-flexible. In the swinging direction, in contrast, they are preferably designed so as to be bending-stiff, in other words, swing-stiff here. The bending properties of the rotor blade-connection arms in the beating and swinging directions, however, can be fundamentally configured in accordance with the requirements in question.

As used in the invention, the terms "bending-flexible, free of centrifugal forces", referring to the rotor mast-connection arms, mean that these arms are constructed so as to be bending-flexible and they are arranged on the rotor head and separated from the centrifugal-force load path of the rotor blades in such a way that they are not loaded by the very high centrifugal forces that occur during operation of the rotor due to the rotating rotor blades. For this reason, they have a particularly high bending-flexibility in comparison to conventional bending-flexible rotor elements, even during operation of the rotor. Therefore, with the rotor according to the invention, those areas that dissipate the rotor blade centrifugal forces and those parts that transmit a driving torque from the motor mast to the rotor head are functionally separated from each other in a shared component.

Owing to this mode of construction according to the invention, especially the plate-shaped rotor head element, with its rotor blade-connection arms and rotor mast-connection arms, can be dimensioned in a very compact and light-weight manner; nevertheless, a very high strength can be achieved for these elements. Since, as already elaborated upon, the rotor mast-connection arms dissipate or absorb virtually no centrifugal forces and the rotor blade-connection arms, in turn, do not have to have any components for introducing torque into the plate-shaped rotor head element, the rotor mast-connection arms and rotor blade-connection arms as well as the adjacent areas of the plate-shaped rotor head element can, in fact, elastically bend unobstructed over the entire radial width of the plate-shaped rotor head element, that is to say, even beyond the rotor axis, between the rotor mast connections in the beating direction. Furthermore, the rotor mast-connection arms can bend elastically relative to the rotor blade-connection arms. This results in a very small (virtual) flapping hinge distance that can amount up to 0%. Consequently, a so-called gimbal rotor, for example, can be realized without discrete components and merely due to the elasticity or flexibility of the plate-shaped rotor head element. A rotor having a small flapping hinge distance is generally perceived by passengers of a rotary-wing aircraft as being very comfortable, also in terms of its flying behavior. Moreover, the embodiment according to the invention accounts for a reduction of the vibrations that occur in the rotor.

In addition, the part length of the available rotor circle radius that is needed to form the virtual flapping hinge is very small in comparison to conventional hingeless or bearingless rotors. Consequently, the sections of the circle radius that are saved in this manner are then available for aerodynamically effective profile areas on the rotor blade. As a result of this, in conjunction with the fact that the plate-shaped rotor head element has a thin construction by definition, the aerodynamics of the rotor are improved. The rotor according to the invention can fundamentally be configured with a high as well as with a low swing-stiffness. Particularly in the case of a wide cross section of the rotor blade-connection arms, however, the plate-shaped rotor head element allows the simple design of a swing-stiff connection of the rotor blades to the rotor head.

In conjunction with the attainable small flapping hinge distance, this configuration is highly advantageous for special applications such as, for instance, in a tilt rotor for a tilt rotor helicopter or airplane. After all, this makes it possible to avoid the swing-deformations caused by Coriolis forces that normally occur during the beating of the rotor blades. A high strength of the rotor can be achieved in this manner as well. In contrast, in the case of a rotor with a swing-stiff construction that has a large flapping hinge distance and consequently an undiminished Coriolis force, it can happen under certain circumstances that it is impossible to ensure sufficient stability of the rotor.

Other preferred and advantageous embodiment features of the rotor according to the invention are the subject matter of the claims.

A second embodiment of the invention includes a rotary-wing aircraft, especially a helicopter, particularly a tilt rotor helicopter. Essentially the same advantages explained above in conjunction with the rotor according to the invention may be achieved by means of the rotary-wing aircraft according to the invention.

BRIEF DESCRIPTION OF THE DRAWING

Preferred embodiments of the invention with additional embodiment details and other advantages will be described and explained in greater detail below while making reference to the accompanying drawings.

The following is shown.

DETAILED DESCRIPTION

Figure 1:
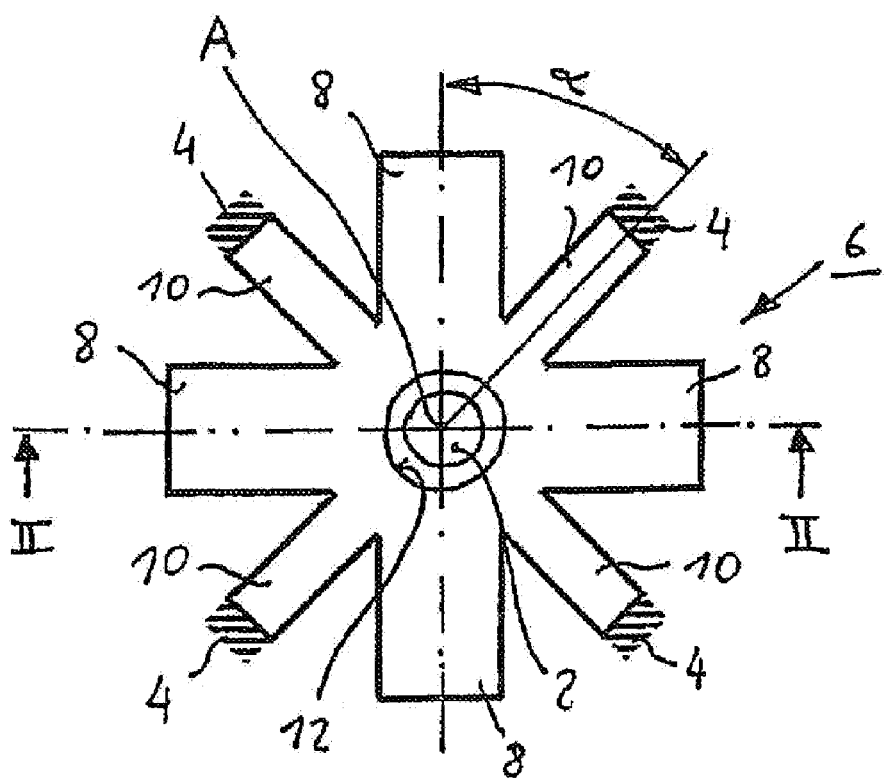
FIG. 1—a schematic top view of an essential area of a rotor according to the invention, in a first embodiment.

In order to avoid repetition, the same parts and components are designated with the same reference numerals in the description below as well as in the figures whenever there is no need to make a further distinction.

FIG. 1 shows a schematic top view of an essential area of a hingeless or bearingless, four-blade rotor according to the invention in a first embodiment. The rotor comprises a rotor mast 2, a torque-transmission element 4 arranged rotationally fixed with respect to the rotor mast 2 as well as at least one thin, plate-shaped rotor head element 6 made primarily of fiber composite material through which the axis of rotation A of the rotor passes. The plate-shaped rotor head element 6 will be referred to below in short as plate 6. As can be seen in FIG. 1, the plate 6 has two different groups of arms 8, 10 arranged in a star pattern. The first group has four bending-flexible and torsion-flexible rotor blade-connection arms 8 that dissipate centrifugal forces and to each of which a rotor blade (not shown here) can be connected. In this context, the torsion flexibility allows a bearingless adjustment of the angle of the connected rotor blade.

The second group has four bending-flexible rotor mast-connection arms 10 that are free of centrifugal force, and to which the plate-shaped rotor head element 6 is connected via the torque-transmission element 4 arranged rotationally fixed with respect to the rotor mast 2. This can be done by means of suitable fastening elements such as, for example, bolts or the like (not shown here). In this example, the free ends of the rotor mast-connection arms 10 engage with the torque-transmission element 4. In the drawing, for the sake of simplicity, the torque-transmission element 4 and its connection areas to the rotor mast-connection arms 10 are only depicted as hatching. The arm sections of the rotor blade-connection arms 8 facing the center of plate 6 and the central plate area or the imaginary intersection area of the individual arms 8, 10 of the plate 6 are essentially entirely free of fastening or attachment elements or clamping sites, since these would prevent an unobstructed deformation of the plate 6 during operation of the rotor.

As indicated in the top view according to FIG. 1, the rotor blade-connection arms 8 in this variant have a flat, wide cross section so that a beating-flexible, swing-stiff blade connection is realized.

The above-mentioned different groups of arms 8, 10 are an integral part of plate 6. Relative to the rotor circle plane, the rotor blade-connection arms 8 are arranged offset with respect to the rotor mast-connection arms 10 by an angle α (here 45°). The rotor mast-connection arms 10 and the rotor blade-connection arms 8 lie in the plane of the rotor blade. In order to avoid stress cracks, the transitions between the rotor blade-connection arms and the rotor mast-connection arms 8, 10 should be configured so as to be flexible and rounded off. For example, on its radial outer free end 20, each rotor blade-connection arm 8 can have a separation point for detachably fastening a rotor blade (not shown here). By the same token, however, according to the invention, each rotor blade-connection arm 8 can also be configured as an integral part of a rotor blade. In actual practice, however, this is probably only meaningful for rotors having a relatively small circle diameter.

As a function of the rotor head construction in question, and especially of the configuration of the torque-transmission element 4 and its connection to the rotor mast 2, the plate 6, as shown in FIG. 1, can have a central opening 12 through which the rotor mast 2 or part of it extends (that is to say, without direct connection to the plate 6 or else with play relative to the plate 6).

Figure 2:
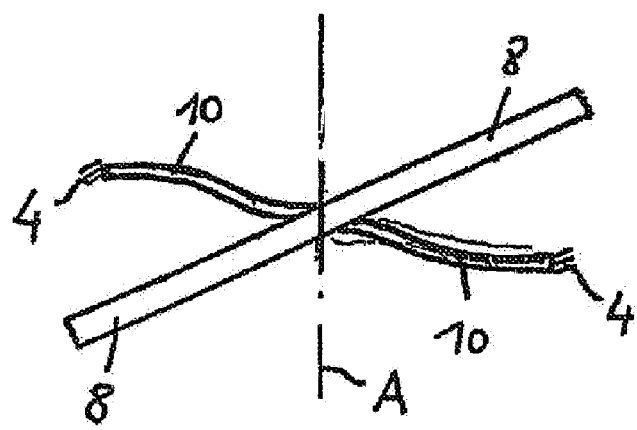
FIG. 2—a schematic sectional view along line II-II of FIG. 1, during operation of the rotor.

FIG. 2 shows a schematic sectional view along line II-II of FIG. 1, during operation of the rotor. For the sake of clarity, the rotor mast has been left out of the sectional depiction. It can be seen in the drawing that the rotor mast-connection arms 10 as well as the adjacent areas of the plate can very easily deform with flexural elasticity relative to the rotor blade-connection arms 8 over considerable areas of the plate 6. In this embodiment, this results in a virtual flapping hinge distance of 0%, like with a so-called gimbal rotor.

Figures 3, 4:
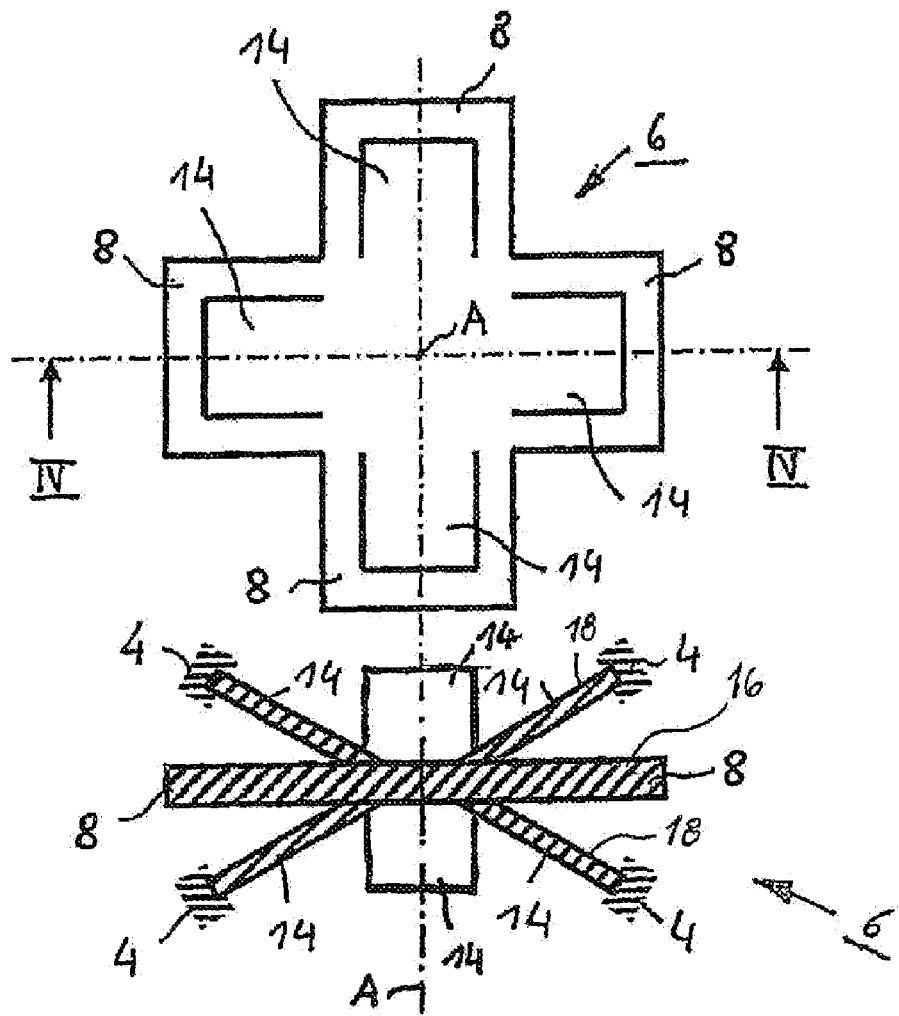
FIG. 3—a schematic top view of an essential area of a rotor according to the invention, in a second embodiment.
FIG. 4—a schematic sectional view along line IV-IV of FIG. 3.

FIG. 3 shows a schematic top view of an essential area of a hingeless or bearingless, four-blade rotor according to the invention in a second embodiment. FIG. 4 shows a schematic sectional view along line IV-IV of FIG. 3. In this variant, the plate 6 has a cruciform horizontal projection. For each rotor blade-connection arm 8, two rotor mast-connection arms 14 are provided which, relative to the direction of the rotor axis A, extend above and below each rotor blade-connection arm 8 in the same radial directions as each appertaining rotor blade-connection arm 8 but in different planes thereto. Here, the rotor mast-connection arms 14 run obliquely upwards or downwards. Fundamentally, however, they could also run parallel to the rotor blade-connection arms 8 or in other suitable orientations relative to said arms.

It is also fundamentally possible for the rotor blade-connection arms 8 and the rotor mast-connection arms 14 to extend in different radial directions relative to the rotor circle plane. Then, unlike what is shown in FIG. 3, the rotor mast-connection arms 14 would be twisted by an angle with respect to the rotor blade-connection arms 8 (similar to what is shown in FIG. 1). The rotor blade-connection arms 8 and the rotor mast-connection arms 14 are made, for example, as an integral part of plate 6. Of course, they can also be made out of several separate plate parts that are joined together to form the plate-shaped rotor head element. For instance, one plate part 16 for the rotor blade-connection arms 8 and two plate parts 18 for the rotor mast-connection arms 14 situated above and below. This joining can already be carried out when the plate 6 is being manufactured, during an intermediate product stage.

Figure 5:
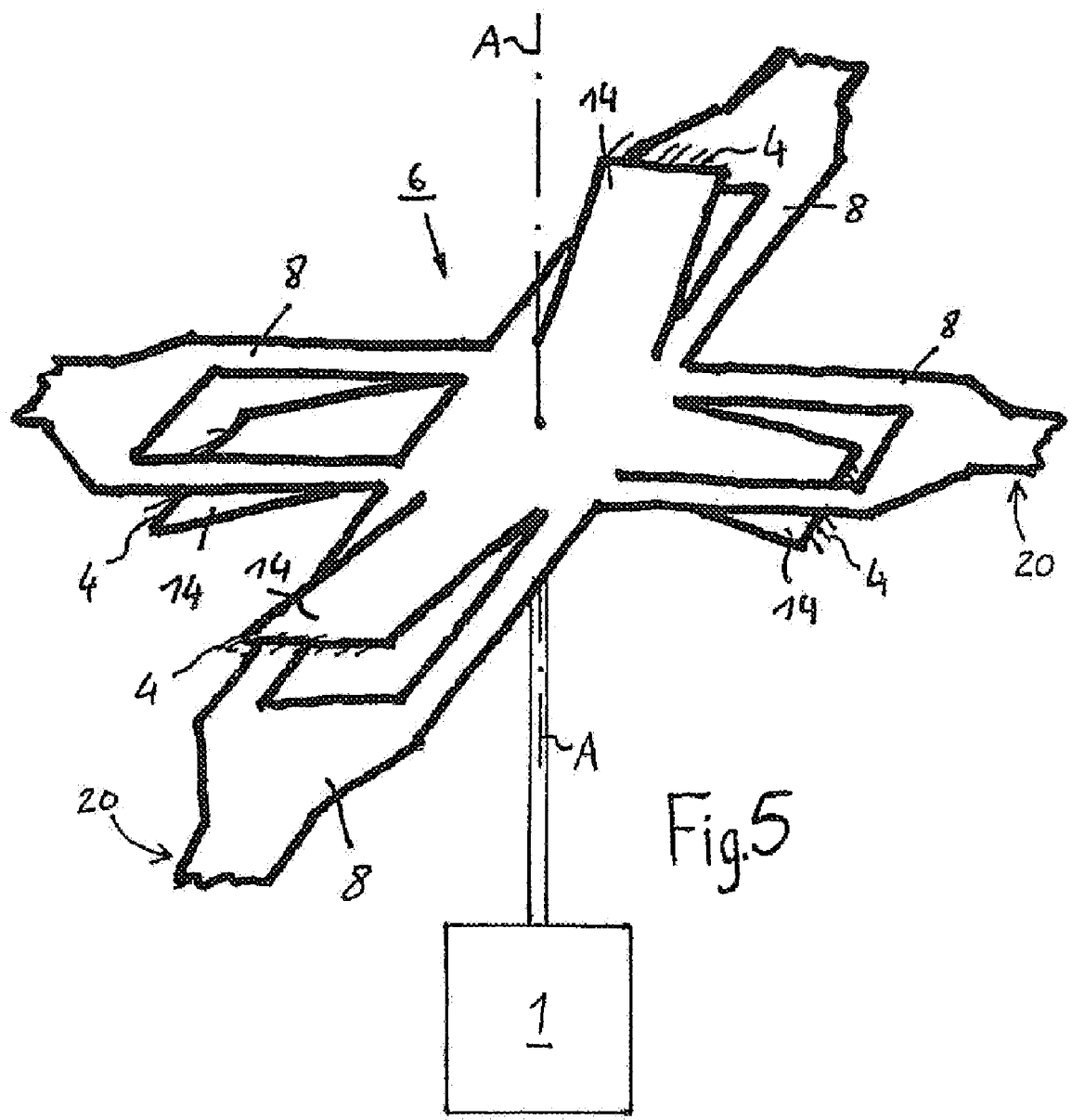
FIG. 5—a schematic perspective view of an essential area of a rotor according to the invention, in a third embodiment.

FIG. 5 shows a schematic perspective view of an essential area of a rotor according to the invention, in a third embodiment. In this variant, the rotor blade-connection arms 8 each have one (or at least one) slit and "notched" inner arm area 14 that is angled upwards or downwards in the direction of the rotor axis A from the plate plane. Axis A also passes through a helicopter 1 shown schematically in FIG. 5. To put it more precisely, these arm areas 14 are angled upwards on two rotor blade-connection arms 8 and downwards on two rotor blade-connection arms 8 (naturally, it is likewise possible to have a notch or angling in only one of these directions). In this embodiment, these angled or "notched" arm areas 14 each form a rotor mast-connection arm 14. In this context, the rotor blade-connection arms 8 and the rotor mast-connection arms 14 each extend in different planes and in the same radial directions with respect to the rotor circle plane. At the same time, owing to this mode of construction, the rotor blade-connection arms 8 acquire a loop-like horizontal projection, as can be clearly seen in FIG. 5. In an advantageous manner, these slits or notches are not made at a later point in time but rather, taking into consideration the preferred mode of construction using fiber composite material, already during the production phase, by means of an appropriately configured and arranged fiber interlaid scrim fixation, followed by final shaping through a cured resin matrix. The loop-like rotor blade-connection arms 8 and the rotor mast-connection arms 14 can also be manufactured separately and then joined to form a unit having the above-described configuration.

Mixed forms from the above-mentioned variants according to the invention are also feasible.

The rotor according to the invention can preferably be employed for a rotary-wing aircraft, especially a helicopter or a tilt rotor helicopter.

The invention is not limited to the embodiments described above, which serve merely to provide a general explanation of the core idea of the invention. Rather, the protective scope of the rotor according to the invention can also include other embodiments aside from those concretely described above.

In particular, the number of rotor blade-connection arms and rotor mast-connection arms of the plate-shaped rotor head element can vary depending on the application case, and can thus be larger or smaller than in the examples above. It is also possible for the number of rotor blade-connection arms and rotor mast-connection arms to differ for a given plate-shaped rotor head element, for example, four rotor blade-connection arms and only two rotor mast-connection arms, or vice-versa. The plate-shaped rotor head element can have one or more layers or else have one or more plate-like parts and/or a constant material thickness, or else it can exhibit different material thicknesses in different areas of the plate. In particular, the material can be thinner in the center area of the plate than at the ends of the rotor blade-connection arms associated with the rotor blades in order to achieve a specific bending or beating behavior. Partial areas of the plate-shaped rotor head element such as, for instance, the free ends of the rotor mast-connection arms that are to be connected to the torque-transmission element can have inserts, reinforcements or adapters made of metal or another suitable material. Particularly the arm cross sections of the rotor blade-connection arms can have cross sectional shapes that differ from a pure strip shape. Here, the cross sectional shape can also have areas of differing material thickness and/or slit segments, whereby the latter primarily exert an influence on the torsion behavior of the arms. By the same token, the arms can be fitted with one or more arm strands arranged above each other and/or side by side. It should also be noticed that, in an actual-practice embodiment, the plate and its arms do not have to have the rectangular or polygonal horizontal projections as depicted in greatly simplified form in the accompanying drawings, but rather, they can naturally also have softer shapes with more flowing transitions.

The reference numerals employed in the claims, description and drawings serve merely to facilitate understanding of the invention and should not be construed as a limitation of the invention.

What is claimed is:

1. A hingeless rotor defining an axis of rotation, comprising
   a rotor mast;
   a torque-transmission element disposed rotationally fixed with respect to the rotor mast; and
   at least one plate-shaped rotor head element having a first group of arms and a second group of arms, the axis of rotation of the rotor passing through the at least one plate-shaped rotor head element, wherein the first group of arms includes a plurality of bending-flexible rotor blade-connection arms that dissipate centrifugal forces, each of which is connectable to a rotor blade, and wherein the second group of arms includes a plurality of bending-flexible rotor mast-connection arms that are free of centrifugal force and connecting the plate-shaped rotor head element to the torque-transmission element,
   wherein the plate-shaped rotor head element includes a central opening, and wherein at least a portion of the rotor mast extends through the central opening connection-free.

2. The rotor as recited in claim 1, wherein the first and second groups of arms are integrally connected portions of the plate-shaped rotor head element.

3. The rotor as recited in claim 1, wherein the rotor blade-connection arms are disposed offset with respect to the rotor mast-connection arms by an angle $\alpha$.

4. The rotor as recited in claim 1, wherein the rotor mast-connection arms lie in a plane of the rotor blades.

5. The rotor as recited in claim 1, wherein each rotor blade-connection arm is an integrally connected with a rotor blade.

6. A rotary-wing aircraft that includes at least one rotor according to claim 1.

7. The rotary-wing aircraft as recited in claim 6, wherein the rotary wing aircraft is at least one of a helicopter and a tilt rotor helicopter.

8. A hingeless rotor defining an axis of rotation, comprising
   a rotor mast;
   a torque-transmission element disposed rotationally fixed with respect to the rotor mast: and
   at least one plate-shaped rotor head element having a first group of arms and a second group of arms, the axis of rotation of the rotor passing through the at least one plate-shaped rotor head element, wherein the first group of arms includes a plurality of bending-flexible rotor blade-connection arms that dissipate centrifugal forces, each of which is connectable to a rotor blade, and wherein the second group of arms includes a plurality of bending-flexible rotor mast-connection arms that are free of centrifugal force and connecting the plate-shaped rotor head element to the torque-transmission element,
   wherein each of the rotor blade-connection arms has at least one slit and notched arm area angled at least one of upwards and downwards in a direction of the rotor axis from a plane of the plate, wherein the at least one arm area forms a rotor-mast connection arm and a loop-like horizontal projection of the respective rotor blade-connection arm.

9. The rotor as recited in claim 8, wherein for each rotor blade-connection arm two rotor mast-connection arms are provided extending above and below the respective rotor blade connection arm in the direction of the rotor axis.

10. A hingeless rotor defining an axis of rotation, comprising
    a rotor mast;
    a torque-transmission element disposed rotationally fixed with respect to the rotor mast: and
    at least one plate-shaped rotor head element having a first group of arms and a second group of arms, the axis of rotation of the rotor passing through the at least one plate-shaped rotor head element, wherein the first group of arms includes a plurality of bending-flexible rotor blade-connection arms that dissipate centrifugal forces, each of which is connectable to a rotor blade, and wherein the second group of arms includes a plurality of bending-flexible rotor mast-connection arms that are free of centrifugal force and connecting the plate-shaped rotor head element to the torque-transmission element, wherein the rotor blade-connection arms and the rotor mast-connection arms each extend in the same radial directions and in a different plane relative to a plane of the rotor blades.

11. A hingeless rotor defining an axis of rotation, comprising
a rotor mast;
a torque-transmission element disposed rotationally fixed with respect to the rotor mast; and
at least one plate-shaped rotor head element having a first group of arms and a second group of arms, the axis of rotation of the rotor passing through the at least one plate-shaped rotor head element, wherein the first group of arms includes a plurality of bending-flexible rotor blade-connection arms that dissipate centrifugal forces, each of which is connectable to a rotor blade, and wherein the second group of arms includes a plurality of bending-flexible rotor mast-connection arms that are free of centrifugal force and connecting the plate-shaped rotor head element to the torque-transmission element, wherein the rotor blade-connection arms and the rotor mast-connection arms each extend in different radial directions in different planes relative to the plane of the rotor blades.

12. A hingeless rotor defining an axis of rotation, comprising
a rotor mast;
a torque-transmission element disposed rotationally fixed with respect to the rotor mast; and
at least one plate-shaped rotor head element having a first group of arms and a second group of arms, the axis of rotation of the rotor passing through the at least one plate-shaped rotor head element, wherein the first group of arms includes a plurality of bending-flexible rotor blade-connection arms that dissipate centrifugal forces, each of which is connectable to a rotor blade, and wherein the second group of arms includes a plurality of bending-flexible rotor mast-connection arms that are free of centrifugal force and connecting the plate-shaped rotor head element to the torque-transmission element, wherein each rotor blade-connection arm has a separation point on an radial outer free end configured to detachably fasten a rotor blade.

13. A hingeless rotor defining an axis of rotation, comprising
a rotor mast;
a torque-transmission element disposed rotationally fixed with respect to the rotor mast; and
at least one plate-shaped rotor head element having a first group of arms and a second group of arms, the axis of rotation of the rotor passing through the at least one plate-shaped rotor head element, wherein the first group of arms includes a plurality of bending-flexible rotor blade-connection arms that dissipate centrifugal forces, each of which is connectable to a rotor blade, and wherein the second group of arms includes a plurality of bending-flexible rotor mast-connection arms that are free of centrifugal force and connecting the plate-shaped rotor head element to the torque-transmission element, wherein each of the rotor blade-connection arms is an integral part of a first plate part, and each of the rotor mast connection-arms is an integral part of a second separate plate part, the first and second plate parts being separate from one another and are combined to form the plate-shaped rotor head element.

* * * * *